Feb. 1, 1966   W. P. SMITH   3,232,785
PRESSURE-SENSITIVE ADHESIVE SHEET
Filed July 6, 1962

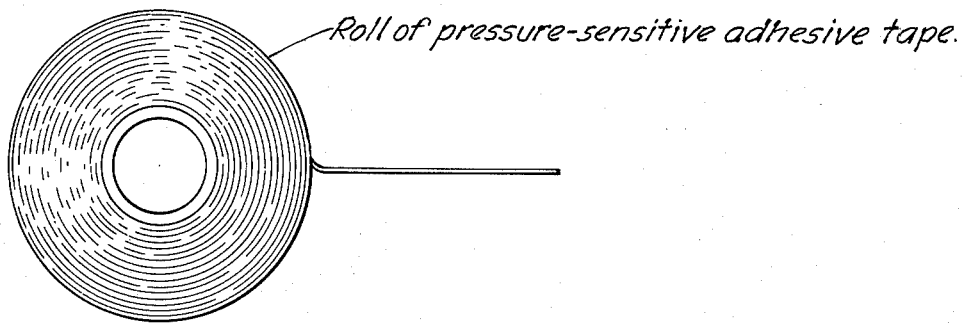

Fig. 1

Roll of pressure-sensitive adhesive tape.

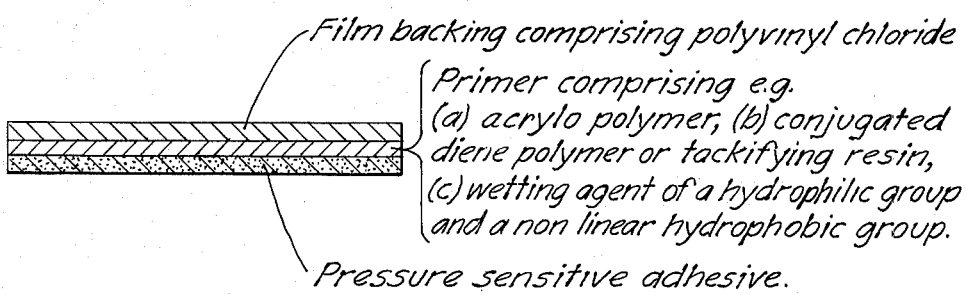

Fig. 2

Film backing comprising polyvinyl chloride

Primer comprising e.g.
(a) acrylo polymer, (b) conjugated diene polymer or tackifying resin,
(c) wetting agent of a hydrophilic group and a non linear hydrophobic group.

Pressure sensitive adhesive.

INVENTOR.
WERTER PIERCE SMITH
BY
Carpenter, Abbott, Coulter & Kinney
ATTORNEYS

3,232,785
PRESSURE-SENSITIVE ADHESIVE SHEET
Werter Pierce Smith, Richfield, Minn., assignor to Minnesota Mining and Manufacturing Company, St. Paul, Minn., a corporation of Delaware
Filed July 6, 1962, Ser. No. 208,095
2 Claims. (Cl. 117—76)

The present invention relates to novel and improved pressure-sensitive adhesive tape or sheet material in which the adhesive film is firmly bonded to the film backing so as to permit the tape or sheet material to be unwound from roll form over wide temperature ranges without transfer or offsetting of the adhesive. More specifically, the present invention concerns a novel improved vinyl film-backed pressure-sensitive adhesive tape in which the adhesive is bonded to the backing through an interposed adhesive primer layer which firmly anchors the adhesive to said backing.

Vinyl film-backed pressure-sensitive adhesive electrical tapes, especially those employing a stretchable plasticized polyvinyl chloride film backing, have been known commercially prior to 1946. See Oace Reissue Patent No. 23,843, granted June 29, 1954, on original application filed January 12, 1946. Since the advent of a commercially useful and stable stretchable and retractable pressure-sensitive adhesive tape, such product has seen wide and increasing commercial use in this and other countries, and in a wide variety of end uses or applications, including electrical and non-electrical applications. Because of the high electrical insulative properties of polyvinyl chloride and polyvinyl chloride-acetate films, such pressure-sensitive tapes have seen very extensive use in electrical applications, such as wrapping of wire splices and the like. More recently improved stretchable vinyl plastic pressure-sensitive adhesive tapes have been marketed having improved handling characteristics and utility over wide temperature ranges, for example, application temperatures of from about 0° F. to about 120° F., and operating temperatures over much wider temperature ranges, e.g. up to about 200° F., or more. An example of such an "all weather" pressure-sensitive adhesive tape is Scotch No. 88 tape marketed by the assignee of this application.

It is of course important that the pressure-sensitive adhesive coating be firmly anchored to the plastic film backing over the useful temperature ranges thereof. And it is especially important, with improved products, that the pressure-sensitive adhesive be anchored to the film backing so as to permit the tape to be unwound from upon itself in roll form without offset or transfer of the adhesive, even where the tape is apt to be unwound and used at low temperatures (such as occur in northern climates), and after prolonged storage at such low temperatures, and at elevated temperatures.

By far the largest quantities of vinyl film used in vinyl film-backed pressure-sensitive tapes is either calendered or extruded; and of this the majority of such film is calendered. In the extrusion and/or calendering of vinyl plastic films for use in pressure-sensitive adhesive tapes, a lubricant is ordinarily employed. For example in the case of a calendered film, a lubricant (or stabilizer which also functions as a lubricant) virtually always is employed in order to prevent the plastic mass during mixing and/or milling from sticking to the mixing and milling equipment, or to the calenders during final calendering of the films. The function of the lubricants, *which characteristically are wax-like in nature*, is to lower the coefficient of the friction of the plastic mix, and to serve as a lubricant during the various mixing, milling, and calendering operations.

Upon formation of the film, the lubricants exist on the surface as well as throughout the mass and also, some lubricants exude onto the surface of the film. Ordinarily more than in the case of other types of film backings for tapes, this presence of the lubricants complicates the problem of firmly anchoring the pressure-sensitive adhesive to the film backing so that the tape will be aggressive and will hold tight in place and to itself, and yet can be unwound from roll form without offsetting or transfer of the adhesive.

Others have addressed themselves to the provision of adhesive primers for pressure-sensitive adhesive tapes, including those having a plasticized vinyl film backing. In this respect, see Bemmels Patent No. 2,647,843, granted August 4, 1953, which concerns itself with the provision of primers which are stated to "perform best" on films such as cellulose ester polymers, such as cellulose acetate, copolymers thereof, cellulose propionate, cellulose butyrate, cellulose nitrate, vinyl halide polymers, such as those of vinyl chloride, vinylidene chloride and copolymers thereof, nylon, polyester film, etc. The aforementioned Oace Reissue Patent No. 23,843 discloses adhesive primers which improve the bond between the pressure sensitive adhesive and the plasticized highly stretchable vinyl film backing over that achieved where no primer is employed.

In the past primers applied from an aqueous dispersion and primers applied from a solvent solution have been employed. Each type has had advantages over the other, and each type has had disadvantages. Solvent based primers ordinarily are more easily handleable and are easier to apply to the vinyl film backing. Water dispersed primers, on the other hand, utilize no volatile organic solvent, and fire, explosion or other hazards attendant thereto are absent. To my knowledge, solvent based primers heretofore have generally provided at least as effective adhesive anchorage as water-dispersed primers, in the instance of vinyl plastic pressure-sensitive adhesive tapes. This has seemed somewhat anomalous to me, inasmuch as it is known that rubbery materials (and adhesive primers are comprised of rubbery materials) are degraded when put into solvent solution, and it would thus seem that a primer applied from aqueous dispersion should have greater internal strength and resistance to softening by plasticizers and the backing film, than a solvent base primer of comparable composition, other factors being equal.

Insofar as I am aware no one, prior to the present invention, has provided a vinyl film backed pressure-sensitive adhesive tape structure utilizing an adhesive primer applied from aqueous dispersion in which the anchorage of the adhesive layer to the backing film is increased substantially beyond a similar structure utilizing a solvent based primer of comparable composition.

The provision of such a structure is thus a primary objective of the present invention. A further more specific object is to provide a readily stretchable and retractable pressure-sensitive adhesive tape structure, wherein a strong stable bond is effected between the vinyl film backing and the adhesive coating by virtue of an interposed primer coat, applied from aqueous dispersion, which can be rolled upon itself and unwound from the roll over wide temperature ranges without transfer or offsetting of the adhesive, and which forms strong stable bonds, such as electrical splice wraps, over much wider operating temperatures. A further and more specific objection is to provide a pressure-sensitive adhesive vinyl film backed tape in which the adhesive is anchored to the vinyl film backing through an interposed improved primer layer, and where the bond between the adhesive and the backing is markedly superior to that wherein a primer of similar composition is employed, which has been applied from solvent solution.

Other objects and advantages will be apparent from the following description taken together with the drawing wherein:

FIG. 1 illustrates a roll of pressure-sensitive adhesive tape embodying my invention; and FIG. 2 is an enlarged cross-sectional view of a portion of the tape of FIG. 1.

In providing the tape structure of the present invention, I employ preferably a plasticized film of polymerized vinyl chloride, or vinyl chloride-vinyl acetate, and an aggressively tacky pressure-sensitive adhesive coated thereon which is in permanent equilibrium with the film backing so as to provide a stable tape structure. The adhesive primer comprises in substantially single phase a rubbery polymer formed from an ethylenically unsaturated monomer containing a functional group, which functional group forms a conjugated system with the ethylenically unsaturated linkage of the monomer, the functional group further being hydrolyzable to a carboxylic acid group. Hereinafter this rubbery polymer is referred to at times as an acrylo polymer. The acrylo polymer is compatible with, i.e., has affinity for the vinyl chloride film backing. The primer composition also includes a material selected from the group consisting of a conjugated diene polymer, such as crude rubber or a rubbery butadiene-styrene copolymer, and a resin such as a tackifying resin useful as a tackifier in a pressure-sensitive adhesive composition. The primer also includes a relatively large amount of an agent characterized by its ability to reduce the surface tension of the primer composition and also lower the interfacial tension between the primer composition and surface of the vinyl film. This latter material, which is also a wetting agent, is defined more particularly hereinafter.

Not only is the anchorage of the adhesives effected by the primers hereof initially markedly greater than that of solvent-based primers of comparable rubber-rubber or rubber-resin constituents, but surprisingly, the disparity widens upon prolonged aging of the tapes.

Adhesive primers heretofore have been comprised of a combination of different rubbery materials, on the one hand, and a combination of a rubbery material and a tackifying resin, on the other hand. Where such primers have been applied from water dispersions, as from latices, very small amounts of stabilizing or emulsifying agents have been employed to maintain the dispersions in stable condition. However, the use of large amounts of wetting agents in conjunction with such primers heretofore has been felt to be a distinct disadvantage in the production of a useful commercial vinyl film backed pressure-sensitive adhesive tape, inasmuch as a major use of such tape is in the electrical field, and the use of even moderately large amounts of wetting agents has been thought to diminish substantially the electrical properties of the resulting tape—particularly under conditions of high humidity. The tape structures of the present invention, contrary to expectation, provide excellent electrical properties, virtually undiminished over similar structures where no primer is employed, or where a solvent base primer is employed. Furthermore, new results are obtained in regard to primer efficiency, providing improved pressure-sensitive adhesive tape structures, wherein the anchorage of the adhesive attributable to the primer remains stable upon long natural aging.

As examples, as the rubbery acrylo polymer constituent of the primer in my novel structure, various butadiene-acrylo-nitrile copolymers are preferred, including those marketed under the trade designation "Hycar 1551," "Hycar 1552," "Hycar 1561" and "Hycar 1562." Carboxy-modified butadiene acrylonitrile rubbery polymers have also been employed, exemplified by the commercially available material sold under the trade designation "Hycar 1572." Other types of rubbery acrylo polymers have been employed, such as terpolymers of butadiene-styrene-acrylo-nitrile (and the carboxy modified derivatives thereof) and polyalkylacrylate polymers, such as polyethylacrylate.

The rubbery conjugated diene polymer utilized with the acrylo polymer is exemplified by rubbery materials compatible with or useful in pressure-sensitive adhesives, such as natural rubber, reclaimed rubber, rubbery butadiene styrene copolymers, polyisoprene, butyl rubbers, etc. The conjugated diene polymer can be replaced in whole or in part by resins which are tackifiers for rubber base pressure-sensitive adhesive compositions, such as polyterpene resins (exemplified by those available commercially under the trade designation "Piccolyte"), coumarone-indene resins (available commercially as "Neville" resins), modified rosins, rosin esters, pentaerythritol esters, and ester gums (such as those available commercially as "Vinsol" resins). Such tackifying resins are well known to those skilled in the pressure-sensitive adhesive art. The amounts of conjugated diene polymer or tackifying resin to be employed relative to the rubbery acrylo polymer vary widely, and optimum amounts depend upon the particular materials employed, in conformance with recognized principles. Generally where the conjugated diolefin is employed I prefer that it be present in amounts of from about 0.3 to about 4 parts per part of rubbery acrylo polymer; and where a tackifying resin is used I prefer it to be present in amounts of from about 0.3 to about 10 parts or more per part of acrylo polymer; all with a view toward obtaining a balanced blend having constituents with affinity for both the pressure-sensitive adhesive and the vinyl film backing between which the primer is interposed.

The wetting agents are characterized by containing basically two parts in the molecule, namely a hydrophilic part and a hydrophobic part, and preferably are of the non-ionic variety, although various anionic materials have been successfully employed. The amount and particular type of wetting agent to be used depends on a number of factors, including the particular nature of the polyvinyl chloride polymer film backing to be used, as affected by the stabilizers, fillers, etc. therein, the particular materials making up the remainder of the primer composition, and concentration of solids in the primer dispersion. Generally I have centered my attention on those wetting agents which reduce the surface tension of water below about 45 dynes/cm. in concentration up to about 2% by weight, and of such wetting agents found those which satisfied the following empirical test to be useful. To a desired acrylo rubber-conjugated diene rubbery polymer or acrylo rubber-tackifying resin water dispersion proposed as a primer coating composition, is added a wetting agent in varying amounts of from about 2–30 parts per 100 parts of total rubbery polymer. After being mixed, the test dispersions are applied as droplets to the surface of the vinyl film backing to be used. The drop is then rubbed with a blunt surface, such as the back edge of a single-edged razor blade, to determine whether the drop will spread into a smooth, uniform, and continuous film (in contrast to gathering into a discontinuous pocked layer). If it does, I have found by and large such a dispersion to be useful in providing a primer in the pressure-sensitive adhesive tape structures of the present invention. Wetting agents which have been found to be suitable for use in compounding the primers of the present invention include non-ionic agents such as octylphenoxypoly (ethyleneoxy) ethanols (e.g. "Igepal CA-630" and "Triton X-100"), nonylphenoxypoly (ethyleneoxy) ethanols (e.g. "Igepal CO-630," "Igepal CO-880," "Igepal CO-970," or "Igepal CO-990"), polyoxyethylene fatty alcohols (e.g. "Emulphor ON-870"), block polymers of ethylene oxide on propylene oxide (e.g. "Pluronics L-64"), and alkylethers of polyethylene glycols (e.g. "Tergitol TMN"); and anionic agents such as alkyl aryl sulfonates (e.g. "Triton X-200"), sodium diamyl sulfosuccinates (e.g. "Aerosol AY"), alkane sulfonates (e.g. "Igepon T" or Igepon AP"), polymerized sodium salt of alkylnaphthalene sulfonic acid (e.g. "Daravan #1") and alkyl benzene sodium sulfonates (e.g. "Santomerse SX").

Generally I have found those wetting agents in which the hydrophobic portions of the molecule are non-linear in that they are branched or include (or contain) cyclic substituents to be greatly preferred.

Having now described by invention in general terms, the following non-limiting examples will more specifically illustrate the same. In the examples, all parts given are by weight, unless otherwise indicated.

EXAMPLE I

A coumarone-indene resin dispersion was first prepared in accordance with the following formulation:

| | Parts |
|---|---|
| Water | 100.0 |
| Polymerized wood rosin ("Polypale")—pulverized | 9.0 |
| Ammonia (26° Baumé) | 6.0 |
| Coumarone-indene resin (Nevillite R-10A)—pulverized | 100.0 |
| 20% "Igepal CA-630" | 5.0 |

The ingredients were charged to a Szegvari Attritor in the order given above to grind the materials to a particle size sufficient to form a stable dispersion. The Szegvari Attritor is a vertical, water jacketed ball mill in which the sides of the vessel are stationary and the balls agitated by a stirrer.

A stable dispersion of an oil soluble heat-advancing phenol-formaldehyde resin was prepared using similar techniques just described, according to the following formulation:

| | Parts |
|---|---|
| Water | 100.0 |
| Ammonia (26° Baumé) | 6.0 |
| Polymerized wood rosin ("Polypale")—pulverized | 9.0 |
| Heat advancing phenol-aldehyde resin "Superbeckacite 1003")—pulverized | 100.0 |
| Casein solution | 15.0 |

The casein solution was made by soaking 100 parts of casein in 400 parts of water with stirring for about a half hour and then adding 400 parts of hot water and 50 parts of 28% aqueous ammonia.

Utilizing the two dispersions prepared as above, the primer dispersion was prepared in accordance with the following formulation:

| | Parts |
|---|---|
| Water | 1740.0 |
| "Igepal CA-630" | 13.0 |
| Ammonia (26° Baumé) | 1.0 |
| Hycar 1552 | 250.0 |
| Coumarone indene resin dispersion | 660.0 |
| Phenol-aldehyde dispersion | 115.0 |
| Vinyl chloride-maleic acid copolymer type resin ("Carbopol 934") 1% aqueous solution | 500.0 |

The water and "Igepal CA-630" were added to a paddle mixer, and mixed until solution was attained, following which the remaining ingredients were added in the order indicated, while stirring was continued. As a precaution the "Carbopol" resin solution was added slowly during mixing so that a uniform homogeneous dispersion resulted.

The primer dispersion was coated at a dry coating weight of 0.5 grain per 24 square inches onto a 6 mil plasticized polyvinyl chloride: vinyl acetate film, dried for 10 minutes at 240° F.

The formulation of the plasticized polyvinyl chloride-vinyl acetate film was as follows:

| | Parts |
|---|---|
| Vinyl resin | 100.0 |
| Alkylene chain terminated polyester of adipic phthalic and lauric acids and propylene glycol and butane diol 1,4 ("Admex 761") | 30.0 |
| Dioctyl phthalate | 13.0 |
| Stabilizer | 2.5 |
| Carbon black | 1.0 |
| Lubricant | 1.25 |
| Antimony trioxide | 4.0 |

Briefly, in compounding the vinyl film, the components were weighed and premixed in a ribbon blender. The premix was processed in a heavy duty internal type mixer ("Banbury") until the batch temperature reached about 300° F., milled at a temperature of from about 300°–310° F., and calendered into film of 6 mil thickness at temperatures of about 300-310° F.

The composition of the plasticized stretchable vinyl film may be varied over a considerable range, so long as a permanent equilibrium is attained between the pressure-sensitive adhesive and the backing. The plasticizers, stabilizers, lubricants, fillers and pigments may be varied over a wide range to obtain special properties required by tape applications, as now known in the art.

The primed surface of the film was then coated at a dry coating weight of 7-8 grains per 24 square inches with a solution of pressure-sensitive adhesive of the following formulation:

| | Parts |
|---|---|
| Rubbery butadiene-styrene copolymer | 100.0 |
| Zinc oxide | 5.0 |
| Titanium dioxide | 7.0 |
| Carbon black | 3.0 |
| Oil soluble heat-reactive phenol-aldehyde resin ("Bakelite 14634") | 12.0 |
| Ester gum | 60.0 |
| Paraffin oil | 20.0 |
| Soft coumarone-indene resin | 40.0 |
| Heptane | 441.0 |
| Alcohol | 4.4 |

In compounding the adhesive the rubbery butadiene-styrene copolymer and pigments were first milled together. The mill base was blended with the ester gum, coumarone-indene resin, paraffin oil and finally the phenol aldehyde resin in a heavy duty internal mixer and heated for a short time at elevated temperatures.

The coated vinyl film was slit into narrow widths and wound onto appropriate cores to provide rolls of pressure-sensitive adhesive tape. The tape of Example I could be unwound from the roll without offsetting the adhesive to the back side of the tape even after storage for long periods of time at subroom temperature and after the tape rolls had been conditioned for seven days at 150° F. Strips of tape could be separated from adhesive to adhesive contact without offsetting of the adhesive. To illustrate the effectiveness of this novel tape, an adhesive "picking" test has been devised: strips of tape are wrapped, adhesive surface outwardly, one strip about the forefinger of each hand. The strips are brought into contact with pressure, and quickly pulled apart in the opposite direction. In the case of Example I tape product the adhesive did not offset or transfer. On the other hand, neither tape made according to the same backing and adhesive composition without a primer, nor tape made utilizing the same butadiene acrylonitrile acrylo rubber and the same coumarone-indene and phenol-aldehyde resin coated from organic solvent would pass the "picking" test without transfer of adhesive. The finished tape had an adhesion value of 40 oz./inch width to a polished steel plate. The tape had an insulation resistance of greater than one million megohms at 96% relative humidity (A.S.T.M. D–1000).

EXAMPLE II

In this example the primer composition was prepared by stirring the following components together in the order given below:

| | Parts |
|---|---|
| Water | 305.0 |
| "Igepal CA–630" | 16.0 |
| Ammonia | 1.0 |
| Rubbery butadiene acrylo nitrile copolymer latex ("Hycar 1552") (52% solids) | 115.4 |
| Crude rubber latex (60% solids) | 64.6 |

The composition was Meyer bar coated onto a 6 mil plasticized vinyl film to give a dry coating weight of approximately 0.5 grain per 24 square inches of vinyl web, dried for 10 minutes at 240° F., with hot air, overcoated with 7–8 grains/24 sq. in. of pressure sensitive adhesive (see below) and thoroughly dried to remove the solvent. The following vinyl film backing and adhesive formulations were processed in the same manner described in Example I and were used in the preparation of tape for Example II.

Backing

| | Parts |
|---|---|
| Vinyl resin (V.Y.N.W.) | 100.0 |
| "Admex 562" plasticizer—a linear condensation polyester of adipic and lauric acids and propylene glycol and butandiol 1,4 | 46.5 |
| Admex 761 | 6.5 |
| Dioctyl phthalate plasticizer | 2.8 |
| Stabilizer | 2.0 |
| Carbon black | 1.25 |
| Lubricant | 1.0 |
| Poly α methyl styrene resin "Styron 276V9" | 4.75 |
| Antimony trioxide | 5.0 |

Adhesive formulation

Component:

| | |
|---|---|
| Crude rubber | 50.0 |
| Rubbery butadiene-styrene copolymer | 50.0 |
| Zinc oxide | 10.0 |
| Carbon black | 3.0 |
| Antioxidant | 2.0 |
| Calcium carbonate pigment | 50.0 |
| Polyterpene resin ("Piccolyte S–85") | 90.0 |
| Dioctyl phthalate | 6.33 |
| Heptane | 499.1 |
| Alcohol | 10.0 |
| Oil soluble heat advancing phenol-aldehyde resin (Br 14634) | 12.0 |

The coated vinyl film was processed into rolls of pressure-sensitive adhesive tapes. This tape could be unwound in a temperature range of 0° F. to 120° F. without any evidence of adhesive transfer. This was also true of rolls which had been subjected to prolonged aging on the shell at normal room temperatures, and of rolls which had been conditioned 7 days at 150° F. The fresh tapes, and those subjected to natural and accelerated aging did not transfer when subjected to the "picking" test. Further, the primer bond was stable to high humidities and elevated temperatures inasmuch as the tape remained intact (no adhesive transfer) when stripped from a polished stell surface and its own backing after being subjected to high humidity for 48 hours at 150° F. The finished tape was good electrically under extreme moisture conditions as evidenced by an insulation resistance of more than one million megohms measured at 96% R.H. The tape had an adhesion to a polished steel plate of 48 oz./inch width.

EXAMPLE III

The primer of Example I was coated onto the 6 mil film of Example II and overcoated with the adhesive of Example II using the techniques as previously described. The dry primer coating weight was 0.5 grain/24 square inches and the adhesive coating weight was 7–8 grains/24 square inches. The finished tape had an adhesion value of 46 oz./inch width on a polished steel plate. The finished tape could be unwound without transferring or offsetting of the adhesive over a temperature range of 10° F. to 120° F. Fresh tapes, tapes which had aged for a long period on the shelf and tapes which had been conditioned for 7 days at 150° F. did not transfer on the adhesive to adhesive strip back or the "picking" test. Further, the finished tape was good electrically under high humidity conditions as determined by an insulation resistance of more than one million megohms at 96% R.H.

EXAMPLE IV

The following primer formulation was prepared by the process described in Example I:

| | Parts |
|---|---|
| Water | 2230.0 |
| "Igepal CA–630" wetting agent | 8.0 |
| Ammonia (26° Baumé) | 1.0 |
| "Hycar 1552" latex | 250.0 |
| Coumarone-indene resin dispersion of Example I | 620.0 |

The above primer was used with both the adhesive of Example I and II on the backing of Example I to produce tapes having excellent anchorage properties. The tapes were processed using the techniques described in Examples I and II. The resulting tapes were capable of being unwound over a wide range of temperatures without transferring or offsetting. At low temperatures the test was limited to the temperature at which the backings broke. Both tapes passed the adhesive to adhesive stripback and picking tests. The insulation resistance of tapes made with Example IV primer was greater than one million megohms at 96% relative humidity. The adhesions to steel were 38 oz. and 50 oz. per inch of width for the adhesive of Example I and Example II, respectively.

EXAMPLE V

The following primer was prepared by stirring the following components together in the order given below:

| | Parts |
|---|---|
| Water | 349.0 |
| "Igepal CA–630" | 16.0 |
| Ammonia (26° Baumé) | 1.0 |
| Hycar 1552 | 96.3 |
| Rubbery butadiene-styrene copolymer latex ("GRS–2003") (59% solids) | 84.8 |

The above primer was coated onto the 6 mil vinyl film of Example I, dried for 10 minutes at 240° F., overcoated with the adhesive of Example I, dried and processed into rolls of pressure sensitive adhesive tape. This tape could be unwound from the roll over a wide temperature range (10° to 120° F.) without offsetting of the adhesive to the backside of the tape. After being conditioned for 7 days at 150° F. and after aging for prolonged periods on the shelf, no offsetting or adhesive transfer occurred on unwinding the tapes. This tape exhibited no adhesive transfer on the adhesive to adhesive stripback and picking tests. Further, the finished tape was good electrically under high humidity conditions having an insulation resistance of $>1 \times 10^6$ megohms at 96% R.H.

The adhesive primer dispersions can be applied by known methods of applying primer compositions to backing films of pressure-sensitive adhesive tapes, such for example as spray, roll coating, knurl roll coating, Meyer bar coating, Kiss roll coating, air knife coating, or any other method which produces a uniform coating of desired coating weights. Conventional drying procedures may be employed. Coating weights are those conventionally employed, ranging generally from about .1 grain to about 1.0 grain per 24 square inches on the dry basis. If desired, the primer composition can contain pigments, fillers, or other additives, including curing agents.

I claim:

1. A vinyl film backed pressure-sensitive adhesive tape comprising a backing film of a film forming polymer of monomers, including at least a major proportion of vinyl chloride, a pressure-sensitive adhesive coated over one surface of said backing film, and an adhesive primer layer applied from an aqueous dispersion interposed between said adhesive and said backing film firmly anchoring said adhesive to said film against adhesive trnasfer when said tape is unwound from roll form over wide ranges of temperature; said primer layer in substantially single phase consisting essentially of (a) a water-insoluble rubbery acrylo polymer, (b) a material selected from the group consisting of a conjugated diene rubbery polymer in the amount of from about 0.3 to 4 parts per part of said acrylo polymer and a tackifying resin in the amount of from about 0.3 to 10 parts per part of said acrylo polymer, and (c) about 2–30 parts per 100 parts of rubbery polymer present from (a) and (b) in said primer layer of a water soluble, organic wetting agent containing in the molecule thereof a hydrophilic group and a non-linear hydrophobic group.

2. A stretchable vinyl film backed pressure-sensitive adhesive tape comprising a plasticized backing film of a film forming polymer of monomers, including at least a major proportion of vinyl chloride, a pressure-sensitive adhesive coated over one surface of said backing film in permanent equilibrium therewith, and an adhesive primer layer applied from an aqueous dispersion interposed between said adhesive and said backing film firmly anchoring said adhesive to said film against adhesive transfer when said tape is unwound from roll form over wide ranges of temperature; said primer layer in substantially single phase consisting essentially of a rubbery copolymer of butadiene and acrylonitrile, a rubbery copolymer of butadiene and styrene in an amount of about 0.3 to 4 parts per part of said copolymer of butadiene and acrylonitrile, and about 6–30 parts of water soluble nonylphenoxypoly (ethyleneoxy) ethanol per 100 parts of the combined rubbery copolymers of butadiene-acrylonitrile and butadiene-styrene.

References Cited by the Examiner

UNITED STATES PATENTS

| | | | |
|---|---|---|---|
| Re. 23,843 | 6/1954 | Oace et al. | 177—122 |
| Re. 24,906 | 12/1960 | Ulrich | 117—122 |
| 2,633,432 | 3/1953 | Kenneway | 117—76 |
| 2,647,843 | 8/1953 | Bemmels | 117—122 |
| 2,878,142 | 3/1959 | Bohaty | 117—76 |
| 2,882,179 | 4/1959 | Blackford | 117—76 |
| 2,884,342 | 4/1959 | Wolff | 117—76 |
| 2,897,960 | 8/1959 | Revoir | 117—76 |
| 2,937,956 | 5/1960 | Fendius et al. | 117—76 |
| 3,084,067 | 4/1963 | Smith | 117—76 |
| 3,089,786 | 5/1963 | Nachtsheim et al. | 117—122 |
| 3,129,816 | 4/1964 | Bond et al. | 117—122 |

FOREIGN PATENTS 231,029 10/1958 Australia.

WILLIAM D. MARTIN, *Primary Examiner.*

MURRAY KATZ, *Examiner.*